US008751129B2

(12) United States Patent
Szymanski et al.

(10) Patent No.: US 8,751,129 B2
(45) Date of Patent: Jun. 10, 2014

(54) ELECTRONIC BRAKE SYSTEM CONTROLS ADAPTATION BASED UPON BRAKE COMPONENT CONDITION

(75) Inventors: Andrew Szymanski, Oxford, MI (US); Vesa Luomaranta, Sault Ste. Marie (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 178 days.

(21) Appl. No.: 13/314,510

(22) Filed: Dec. 8, 2011

(65) Prior Publication Data
US 2013/0151101 A1  Jun. 13, 2013

(51) Int. Cl.
*B60T 7/12* (2006.01)
(52) U.S. Cl.
USPC .................................. 701/78; 701/70; 701/79

(58) Field of Classification Search
USPC .................................. 701/70, 78, 79; 303/155
See application file for complete search history.

(56) References Cited

U.S. PATENT DOCUMENTS

| 5,333,944 | A  | * | 8/1994 | Shirai et al. ...................... 701/70 |
| 5,984,433 | A  | * | 11/1999 | Stumpe et al. ................. 303/155 |
| 6,332,354 | B1 | * | 12/2001 | Lalor et al. ....................... 701/70 |
| 6,923,512 | B2 |  | 8/2005 | Anderson |
| 2007/0216222 | A1 | * | 9/2007 | Miyazaki et al. .............. 303/155 |

* cited by examiner

*Primary Examiner* — Thomas Tarcza
*Assistant Examiner* — Kevin Myhre

(57) ABSTRACT

A method of operating a brake system comprises determining a predicted braking effectiveness for a plurality of vehicle braking operations and determining an actual braking effectiveness for the plurality of vehicle braking operations. The predicted braking effectiveness is compared to the actual braking effectiveness. An adjustment factor for the brake system is determined based upon the comparison and the brake system response is adjusted based on the determined adjustment factor.

14 Claims, 2 Drawing Sheets

ELECTRONIC BRAKE SYSTEM CONTROLS ADAPTATION BASED UPON BRAKE COMPONENT CONDITION

TECHNICAL FIELD

The present disclosure relates to automotive vehicles and more particularly to electronic brake systems for automotive vehicles.

BACKGROUND

The present invention relates to a hydraulic control unit of an electronically controlled hydraulic brake system capable of performing functions like anti-lock control, traction control or electronic stability control. Maintaining optimal performance for vehicle brake systems is important. However, the surface of the brake rotors may degrade over time causing a decrease in the braking performance of the vehicle. In order to protect the vehicle brakes from degradation during manufacturing, assembly, and prior to the sale of the vehicle protective coatings may be applied to the surface of the brakes. However, these coatings may have the affect of decreasing brake performance until the coating has been worn away by use.

Braking effectiveness for commercial vehicles may also have a temporary decrease due to a coating that forms on the brake surface during light braking applications. However, this coating is quickly removed during a heavy braking application and does not affect long term braking effectiveness of the vehicle and is particular to commercial vehicle application.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of operating a brake system comprises determining a predicted braking effectiveness by comparing an original braking pressure and a predicted vehicle deceleration for a plurality of vehicle braking operations. An actual braking effectiveness is determined by comparing the original braking pressure and an actual vehicle deceleration for the plurality of vehicle braking operations. The predicted braking effectiveness is compared to the actual braking effectiveness. An adjustment factor for the brake system is determined based upon the comparison and the brake system response is adjusted based on the determined adjustment factor.

A method of operating a brake system comprises determining a predicted braking effectiveness for a plurality of vehicle braking operations where active braking interventions are not applied and determining an actual braking effectiveness for the plurality of vehicle braking operations. The predicted braking effectiveness is compared to the actual braking effectiveness. An adjustment factor for the brake system is determined based upon the comparison and the brake system response is adjusted based on the determined adjustment factor.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
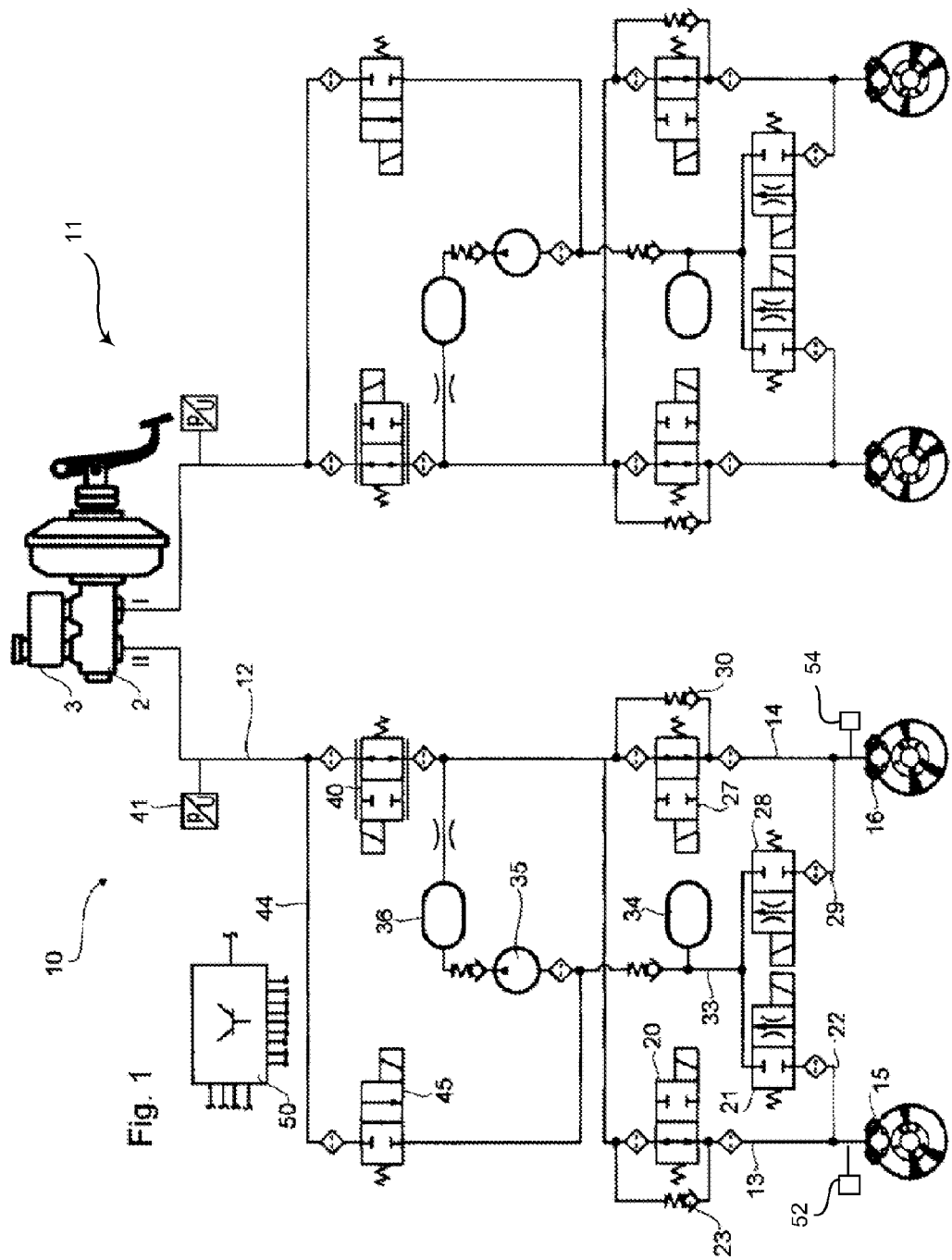
FIG. 1 is a schematic illustration of a hydraulic brake system of the present invention.

The following description is merely exemplary in nature and is in no way intended to limit the disclosure, its application, or uses. For purposes of clarity, the same reference numbers will be used in the drawings to identify similar elements. FIG. 1 shows a hydraulic dual-circuit brake system 10 for a motor vehicle 11 capable of performing anti-lock brake control as well as active interventions for traction control, ESC, ARP, and the like. The brake system 10 has a pedal-actuated tandem master brake cylinder 2 with a brake fluid reservoir 3. Both brake circuits of the shown brake system 10 have the same set-up. Thus the following description of brake circuit II applies to brake circuit I as well.

The brake line 12 of brake circuit II begins at the master brake cylinder 2 and splits into two inlet lines 13 and 14. Inlet line 13 leads to a wheel brake 15 and inlet line 14 leads to a wheel brake 16 of a driven axle of the vehicle 11.

A valve assembly that comprises an inlet valve 20 disposed in the inlet line 13 and an outlet valve 21 that is located in a return line 22 is associated with the wheel brake 15. The inlet valve 20 has a spring-actuated open position and an electromagnetically switchable blocking position. The outlet valve 21 has a spring-actuated blocking position and an electromagnetically switchable open position. A one-way valve 23 is disposed in the inlet line 13 parallel to the inlet valve 20. The two-position valves 20 and 21 of the valve assembly also serve the purpose of brake pressure modulation; in switching positions and, a brake pressure build-up is possible in the wheel brake 15, while in the switching positions and, pressure holding and in switching positions and pressure reduction in wheel brake 15 are possible.

Another valve assembly is likewise associated with the wheel brake 16 and similar to the valve assembly associated with wheel brake 15 comprises an inlet valve 27 in the inlet line 14 and an outlet valve 28 in a return line 29. A one-way valve 30 is connected parallel to the inlet valve 27 in the inlet line 14. The two-position valves 27 and 28 of the valve assembly 26 again have the purpose of modulating the pressure in the wheel brake 16.

The return lines 22 and 29 originating at the inlet lines 13 and 14 between the two-position valves 20 and 27 and the wheel brakes 15 and 16 are united in a return line 33 that is connected to the brake line 12. A low-pressure accumulator 34 communicates with the return line 33. Essentially disposed downstream of the low-pressure accumulator 34 in the return line 33 are a pump 35, a damper chamber 36 and a throttle. The pump 35 is a self-priming pump.

A shut-off valve 40 with a parallel-connected one-way bypass valve 41 is disposed in the brake line 12 between the master brake cylinder 2 and the connection of the return line 33. The shut-off valve 40 has a spring-actuated open position and an electromagnetically switchable blocking position. In its blocking position, the shut-off valve 40 includes a pressure limiting function, which prevents excessive pressure build-up in the brake line below the shut-off valve 40.

A bypass line 44 begins at the brake line 12 between the master brake cylinder 2 and the shut-off valve 40. Disposed in the bypass line 44 is a switch-over valve 45 having one spring-actuated closed position and one electromagnetically switchable open position. The bypass line 44 is connected to the return line 33 between the inlet side of the self-priming pump 35 and the low-pressure accumulator 34.

The brake system 10 includes an electronic control unit (ECU) 50, which can evaluate signals from various sensors 52, 54 that monitor the rotational behavior of the vehicle 11, e.g. wheel speed sensors. The ECU 50 controls the pump 35 and valves 20, 21, 27, 28, 40, 45 in accordance with a situation-specific control algorithm and, in the event that the demands of two control algorithms are in conflict with each other, arbitrates the demands to find a compromise or to give priority to one of them over the other.

The brake system shown 10 is capable of performing active brake interventions, i.e. of building up brake pressure independent of the driver's operation of the brake pedal. The ECU 50 for the brake system 10 monitors the various sensors 52, 54 to determine the actual brake system 10 response for the vehicle 11. Likewise the ECU 50 determines the predicted brake system 10 response for the vehicle 11 based upon the actual brake pressure ($B_P$) within the brake system 10 and the control algorithms.

By comparing a predicted braking effectiveness to an actual braking effectiveness the ECU 50 can determine if there is degradation of the brake system 10 decreasing the braking effectiveness of the vehicle 11. An adjustment factor for the brake system 10 response can be determined based upon the comparison and the brake system 10 response can accordingly be adjusted.

The adjustment factor may be an increase in braking pressure ($B_P$) for the brake system 10. Therefore, an original braking pressure may be a braking pressure ($B_P$) at a given time for the brake system 10 prior to application of the adjustment factor. Accordingly, a modified braking pressure may be a braking pressure ($B_P$) at a given time for the brake system 10 after application of the adjustment factor. The adjustment factor may be dependent on the original braking pressure such that, as the original braking pressure increases the adjustment factor also increases.

In one embodiment a predicted braking effectiveness is the predicted stopping distance of the vehicle 11 and an actual braking effectiveness is the actual stopping distance of the vehicle 11. The ECU 50 compares the actual stopping distance to the predicted stopping distance to determine the adjustment factor for the brake system 10 response. The ECU 50 accordingly adjusts the brake system 10 response based on the determined adjustment factor.

By comparing the predicted braking effectiveness to the actual braking effectiveness the ECU 50 can determine if there is degradation of the brake system 10 decreasing the braking effectiveness of the vehicle 11. The predicted braking effectiveness to the actual braking effectiveness of the vehicle 11 can be compared over multiple braking operations to provide accurate information, e.g. for the last five brake operations. Additionally, the ECU 50 may be reset to take into account a sudden shift in the comparison that would indicate wheel brake 15, 16 repair or replacement. Braking maneuvers which require an active braking operation, e.g. as a result of wheel slip, may be factored out of the comparison by the ECU 50 to maintain accurate data.

Figure 2:
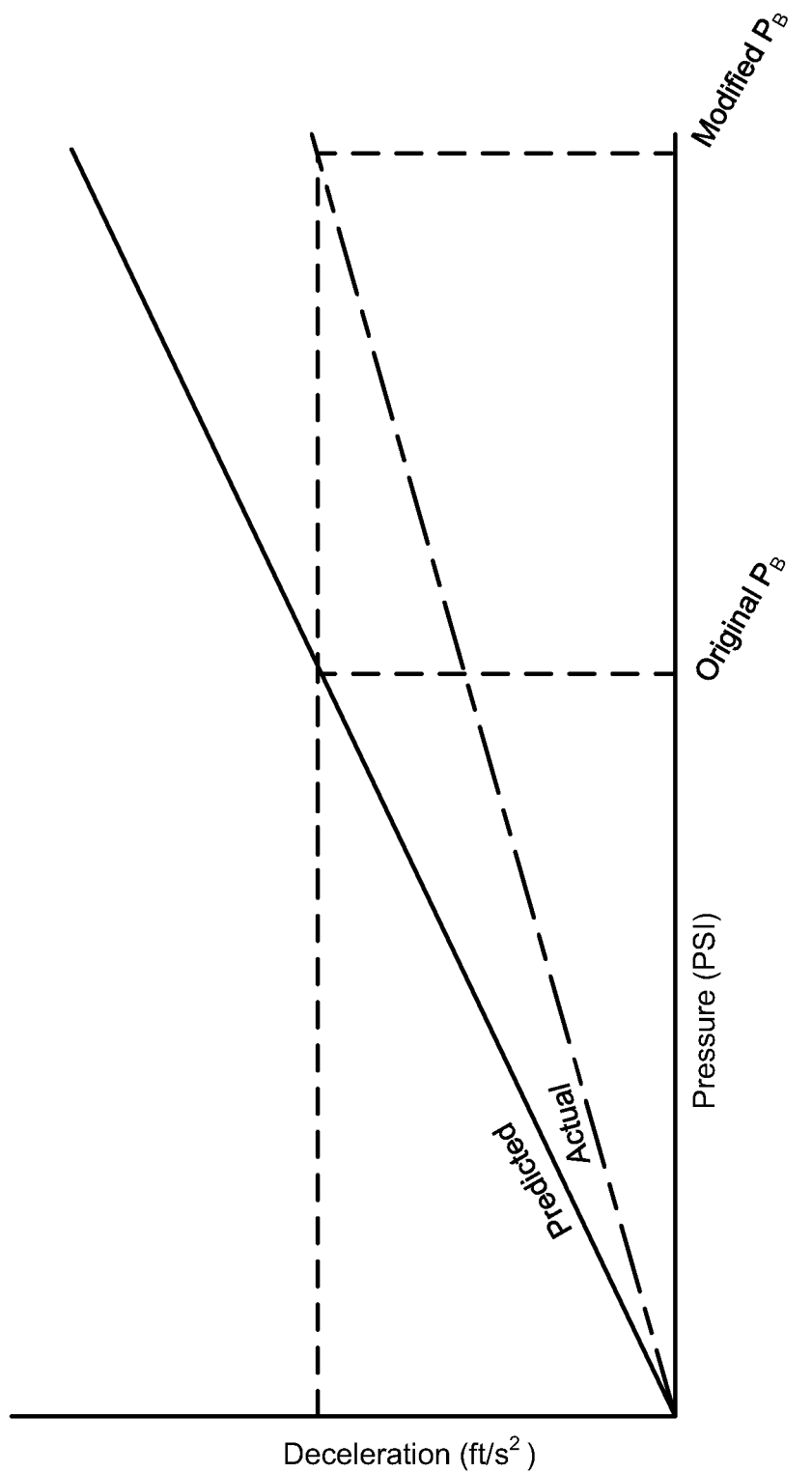
FIG. 2 is a graphical illustration of a comparison for a predicted braking effectiveness and an actual braking effectiveness for a vehicle using the hydraulic brake system of FIG. 1.

FIG. 2 shows another embodiment of determining braking effectiveness by comparing the original braking pressure ($B_P$) measured at the master cylinder 2 to the deceleration of the vehicle 11. The example comparison between an original braking pressure ($B_P$) and a predicted vehicle 11 deceleration illustrates a predicted braking effectiveness. The comparison of the original braking pressure ($B_P$) and an actual vehicle deceleration for the vehicle 11 illustrates the actual braking effectiveness. In the embodiment shown, the actual deceleration of the vehicle 10 is lower than the predicted deceleration of the vehicle showing a decrease in braking effectiveness.

The braking effectiveness map, as shown in FIG. 2, can be input in the ECU 50. Comparison of the predicted braking effectiveness and the actual braking effectiveness is used to determine the adjustment factor for the brake system 10 response. The adjustment factor is dependent on the actual braking pressure in the brake system 10. That is, the value of the adjustment factor to the brake system 10 varies according to the original braking pressure ($B_P$). The brake system 10 response may be adjusted by modifying the braking pressure ($B_P$) within the brake system 10 by the adjustment factor, i.e. the braking pressure amount indicated by the braking effectiveness map, shown in FIG. 2. Thus, the adjustment factor for the brake system is the increase in braking pressure ($B_P$) required to increase the actual vehicle deceleration to the predicted vehicle deceleration. The brake system 10 adjusts the braking pressure ($B_P$) to a modified braking pressure.

The ECU 50 can utilize the control algorithms to adjust the overall braking pressure ($B_P$) within the brake system 10 to compensate for the decreased effectiveness and maintain optimal stopping distance for the vehicle 10. The adjusted operation of the brake system 10 can be taken into account when the ECU 50 performs other active braking interventions. Similarly, other active braking interventions may be factored out of the consideration for braking performance, such that environmental conditions leading to decreased stopping distance of the vehicle 11 are not factored into the braking effectiveness of the brake system 10.

Additionally, for brake systems 10 where the rotors for the brakes 15, 16 are known to have coatings applied to them which will reduce brake effectiveness an initial predicted braking effectiveness may be input into the ECU 50 for the brake system. Therefore, the brake system 10 will adjust for the decreased effectiveness starting at the initial braking operation. Subsequent braking operations may rely on the initial determining a predicted braking effectiveness and previous braking operations to determine the adjustment factor similar to the manner described above.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:
1. A method of operating a brake system comprising:
  determining a predicted braking effectiveness by comparing an original braking pressure and a predicted vehicle deceleration for a plurality of vehicle braking operations, wherein the predicted braking effectiveness is based upon an initial predicted braking effectiveness value in the electronic control unit, and wherein the initial predicated brake effectiveness is applied at an initial brake operation following assembly of the vehicle;

determining an actual braking effectiveness by comparing the original braking pressure and an actual vehicle deceleration for the plurality of vehicle braking operations;

comparing the predicted braking effectiveness to the actual braking effectiveness;

determining an adjustment factor for the brake system based upon the comparison, wherein the adjustment factor is dependent on the original braking pressure, and wherein the adjustment factor is initially based upon a predicted decreased brake effectiveness due to a coating applied to at least one of the brakes; and adjusting the brake system response based on the determined adjustment factor.

2. The method of claim 1, wherein the adjusting the brake system response further comprises increasing the braking pressure to a modified braking pressure.

3. The method of claim 2, wherein the adjustment factor for the brake system is the braking pressure required to increase the actual vehicle deceleration to the predicted vehicle deceleration.

4. The method of claim 2, wherein the original braking pressure for the brake system is the braking pressure at a given time prior to adjusting the brake system by the adjustment factor and the modified braking pressure may be an actual braking pressure at a given time after application of the adjustment factor.

5. A method of operating a brake system comprising:

determining a predicted braking effectiveness for a plurality of vehicle braking operations where active braking interventions are not applied, wherein the predicted braking effectiveness is based upon an initial predicted braking effectiveness value in the electronic control unit, wherein the initial predicated brake effectiveness is applied at an initial brake operation following assembly of the vehicle;

determining an actual braking effectiveness for the plurality of vehicle braking operations;

comparing the predicted braking effectiveness to the actual braking effectiveness;

determining an adjustment factor for the brake system based upon the comparison, wherein the adjustment factor is dependent on the original braking pressure, and wherein the adjustment factor is initially based upon a predicted decreased brake effectiveness due to a coating applied to at least one of the brakes; and adjusting the brake system response based on the determined adjustment factor.

6. The method of claim 5, wherein determining the predicted braking effectiveness further comprises comparing an original braking pressure and a predicted vehicle deceleration for the plurality of vehicle braking operations and determining an actual braking effectiveness by comparing the original braking pressure and an actual vehicle deceleration for the plurality of vehicle braking operations.

7. The method of claim 5, wherein the adjusting the brake system response further comprises increasing the braking pressure to a modified braking pressure.

8. The method of claim 6, wherein the adjustment factor for the brake system is the braking pressure required to increase the actual vehicle deceleration to the predicted vehicle deceleration.

9. The method of claim 6, wherein the original braking pressure for the brake system is the braking pressure at a given time prior to adjusting the brake system by the adjustment factor and the modified braking pressure may be an actual braking pressure at a given time after application of the adjustment factor.

10. The method of claim 5, wherein determining the predicted braking effectiveness further comprises comparing a predicted vehicle stopping distance for the plurality of vehicle braking operations to an actual vehicle stopping distance.

11. The method of claim 1, wherein the adjustment factor increases as the original brake pressure increases.

12. The method of claim 1, wherein comparing the predicted braking effectiveness to the actual braking effectiveness further comprises adjusting the comparison to account for sudden shifts in difference from a previous comparison of the predicted braking effectiveness to the actual braking effectiveness and performing the comparison only when active braking interventions are not applied.

13. The method of claim 5, wherein the adjustment factor increases as the original brake pressure increases.

14. The method of claim 5, wherein comparing the predicted braking effectiveness to the actual braking effectiveness further comprises adjusting the comparison to account for sudden shifts in difference from a previous comparison of the predicted braking effectiveness to the actual braking effectiveness.

\* \* \* \* \*